United States Patent Office 2,804,464
Patented Aug. 27, 1957

2,804,464

PREPARATION OF THIOINDIGOID DYESTUFFS

Earl Kaplan, North Plainfield, and Wendell P. Munro, Martinsville, N. J., assignors to American Cyanamid Company, New York, N. Y., a corporation of Maine No Drawing. Application June 28, 1954,
Serial No. 439,885

9 Claims. (Cl. 260—331)

This invention relates to an improved process of manufacturing thioindigoid dyestuffs.

The preparation of thioindigoid dyestuffs by the oxidation of thioindoxyl is well known. Thioindoxyl is tautomeric with 3-oxythionaphthene, which name is used for convenience elsewhere in this disclosure. Thioindoxyl is indexed in Chemical Abstracts as 3(2H)-thianaphthenone, and 3-thianaphthenol, as both keto and enol forms exist. Generally the oxidation of thioindoxyl is carried out in aqueous alkaline medium at a temperature of around 90°–95° C. with the use of various oxidizing agents such as sodium polysulfide, air and copper sulfate, potassium ferricyanide and the like.

The conventional oxidizing agents are not without serious disadvantages, however. Difficultly removable by-products from the oxidation process often contaminate the finished dyes. In addition, the finished products are often obtained in particle sizes which are unsuited to their use as dyestuffs or in printing pastes. The usual conditioning procedures either cannot be used or are expensive extra steps which do not improve the particle size sufficiently. For example, when air and copper sulfate are used to oxidize the oxythionaphthene to the dye, the product always contains residual amounts of copper ion which are deleterious in certain modern uses. It is necessary to remove these by a time and labor-consuming extra purification step, involving boiling the product with acid. Likewise, the use of a polysulfide as the oxidation reagent requires that the dyestuff be purified to remove precipitated sulfur. These purifications are necessary because even trace amounts affect the utility of the dye. For example, it is known that small amounts of sulfur in a print paste cause irreparable damage to the copper print rollers. In addition, trace amounts of copper cause deterioration of latex backing on dyed cloth. Moreover, the use of sodium polysulfide as an oxidizing agent produces products of undesirably large particle size, often as large as eight microns in size. Print pastes prepared from such products having such large particle sizes show marked deficiencies under practical mill conditions of printing.

The present invention is based upon the discovery that the oxidation of 3-oxythionaphthene, or substitution product thereof, to the corresponding thioindigoid dyestuff can be carried out by employing a nitro aromatic sulfonic acid as the oxidation agent which has none of the disadvantages of the prior art oxidizing agents. The finished dyestuff surprisingly needs no purification, a simple inexpensive water washing sufficing to remove salts and excess alkali. Furthermore, the product has a particle size of less than about one micron in size.

It is an advantage of the present invention that the hereinafter described oxidizing agents result in the production of thioindigoid dyes of improved strength and shade for vat printing and resin bonded pigment printing uses, as well as being highly useful materials in solution dyeing processes.

In the practice of the present invention, the oxidation of the oxythionaphthene, preferably in an aqueous alkaline medium, is carried out by the addition thereto of a suitable aryl nitrosulfonic acid. The reaction mixture is preferably agitated to decrease the time necessary for the reaction to take place. The reaction proceeds smoothly and upon completion the thioindigoid dyestuff is removed by filtration and freed from salts simply by washing with water.

The temperature of the reaction is that of the conventional oxidizing procedures, namely, of the order of about 90–95 C. although temperatures up to the boiling point of the solution may be used.

The oxythionaphthene may be used dry or as a paste in caustic solution, but as stated above, the preferred procedure is to use a solution of the oxythionaphthene in caustic.

The aryl nitrosulfonic acids used in the oxidation process of the present invention are preferably the nitro aromatic sulfonic acids of the benzene and naphthalene series, practical examples of which are p-nitrobenzenesulfonic acid, o-nitrobenzenesulfonic acid, m-nitrobenzenesulfonic acid, 4-nitrotoluene-2-sulfonic acid, 2-chloro-4-nitrobenzenesulfonic acid, 2-chloro-5-nitrotoluene-4-sulfonic acid, 2,4-dinitrobenzene-sulfonic acid, nitrobenzene-2,5-disulfonic acid, 1-nitronaphthalene-5-sulfonic acid, 1-nitronaphthalene-6-sulfonic acid, 1-nitronaphthalene-7-sulfonic acid, 1-nitronaphthalene-8-sulfonic acid, 1-nitro-2-methoxynaphthalene-6-sulfonic acid, 2-nitronaphthalene-1,4-disulfonic acid, and 2-nitronaphthalene-4,8-disulfonic acid, etc.

Generally, it is preferred to use the nitro aromatic sulfonic acid in the form of its water-soluble alkali metal or alkaline earth metal salt such as the sodium, potassium, ammonium, calcium, or barium salt. In addition, a combination of such salts may be used as well as the salt or salts of isomeric nitrosulfonic acids such as are obtained, for example, in the nitration of naphthalene sulfonic acids or the sulfonation of nitronaphthalenes. It is also possible to add the acid itself to the reaction mixture containing the metallic ions thereby producing an effect similar to that obtained by addition of the salt.

At least one mole equivalent of the nitrosulfonic acid calculated on the basis of each nitro group in the nitro aromatic sulfonic acid should be used for 6 moles of the oxythionaphthene. However, a ratio of 2 to 3 mole equivalents to 6 moles of the oxythionaphthene is preferred. The ratio used in actual practice is partly determined by economic considerations. Using a larger proportion of the nitrosulfonic acid makes possible shorter reaction times. Lowering the proportion of the nitrosulfonic acid increases the time necessary for the reaction. By operating within the preferred range, optimum results are obtained. The time of reaction may sometimes be decreased to advantage by blowing air through the reaction solution which hastens the oxidation.

The mechanism of the reaction of the present invention employing an aryl nitrosulfonic acid has not been clearly demonstrated. Simultaneous oxidation of the oxythionaphthene and reduction of the nitro group are believed to occur, but the extent of reduction of the nitro group in each case is not clear. Consequently, the present invention is not limited to any particular theory of reaction.

The present invention may be usefully applied to the oxidation of various oxythionaphthene intermediates to produce the corresponding thioindigoid dyestuffs. These include substitution products as well as fused ring compounds such as benzo derivatives and the like. The oxythionaphthene intermediates are prepared by methods known to the art. Illustrative examples of oxythionaphthenes and corresponding thioindigoid dyestuff are the following:

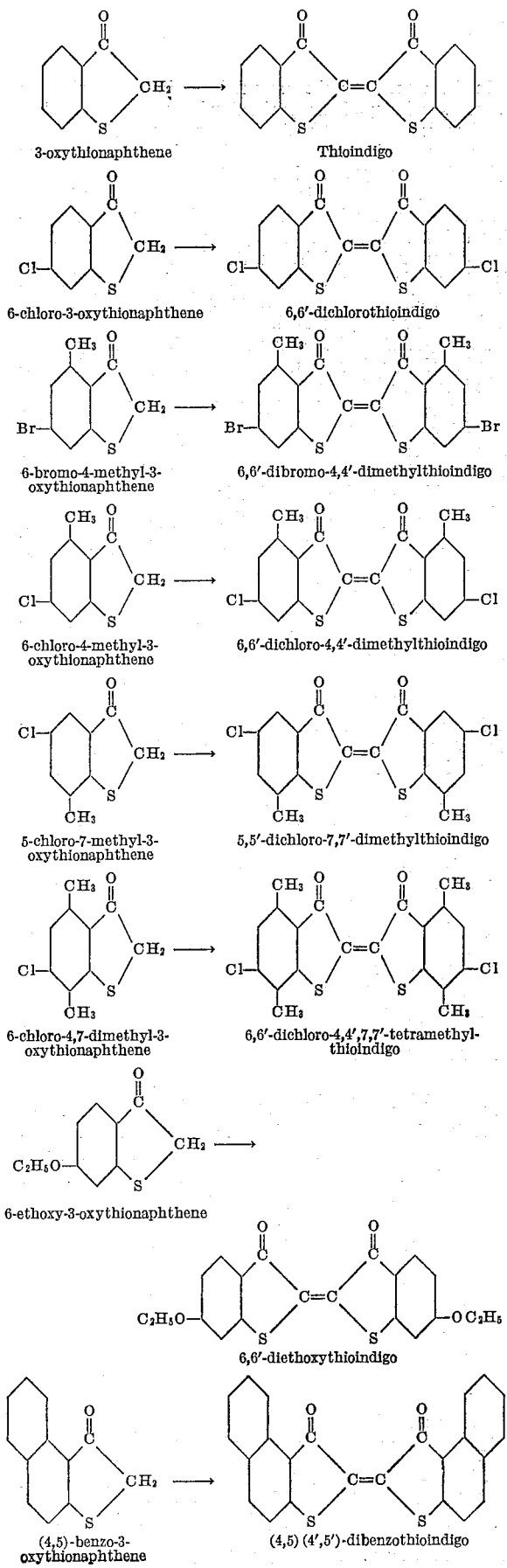

It is also within the scope of this invention to prepare a mixture of symmetrical and unsymmetrical thioindigoid dyestuffs, that is, for example, 6-ethoxy-3-oxythionaphthene and 6-chloro-4-methyl-3-oxythionaphthene may be oxidized as hereinbefore described to produce the unsymmetrical thioindigoid, namely, 6-ethoxy-6'-chloro-4'-methylthioindigo together with 6,6'-dichloro-4,4'-dimethylthioindigo and 6,6'-diethoxythioindigo.

The invention will be described in greater detail in conjunction with the following specific examples in which the parts are by weight unless otherwise specified.

*Example 1*

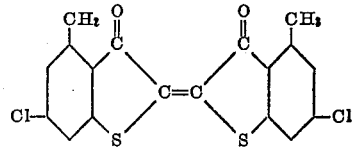

A slurry of 75 parts of moist 6-chloro-4-methyl-3-oxythionaphthene with 750 parts of water and 12.5 parts of sodium hydroxide is prepared and to this is added 20 parts of potassium m-nitrobenzenesulfonate. The slurry is stirred and heated at about 90° C. until the reaction is substantially complete, and the product is then removed by filtration and washed alkali-free with water.

With a smaller proportionate amount of potassium m-nitrobenzenesulfonate the reaction can nevertheless be carried to completion, but a longer time is necessary.

*Example 2*

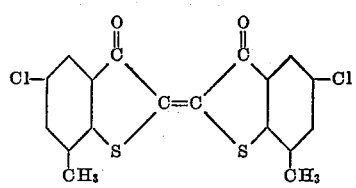

The procedure of Example 1 is followed except that 5-chloro-7-methyl-3-oxythionaphthene is used in place of the 6-chloro-4-methyl-3-oxythionaphthene.

*Example 3*

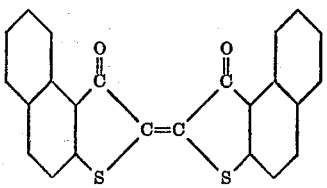

To 700 parts of an aqueous caustic soda solution containing approximately 14 parts of (4,5)-benzo-3-oxythionaphthene heated to above 90° C. are added 7 parts of potassium m-nitrobenzenesulfonate. The product starts to precipitate in a very short time and the mixture is heated with stirring at about 95–100° C. until the precipitation is complete. The product is separated by filtration and washed with water until alkali-free.

*Example 4*

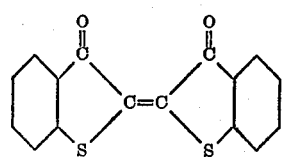

The procedure of Example 1 is followed except that an equivalent amount of 3-oxythionaphthene is used instead of the 6-chloro-4-methyl-3-oxythionaphthene.

Example 5

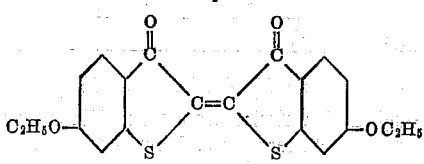

The procedure of Example 1 is followed except that an equivalent amount of 6-ethoxy-3-oxythionaphthene is used instead of the 6-chloro-4-methyl-3-oxythionaphthene.

Example 6

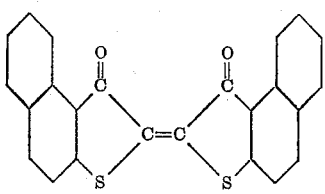

The procedure of Example 3 is followed except that an equivalent amount of sodium m-nitrobenzenesulfonate is used in place of the potassium salt.

Example 7

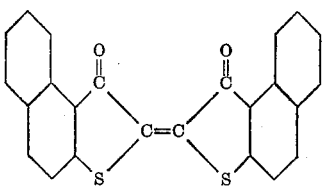

The procedure of Example 3 is followed except that an equivalent amount of potassium 2-nitrotoluene-4-sulfonate is used in place of the potassium m-nitrobenzenesulfonate.

Example 8

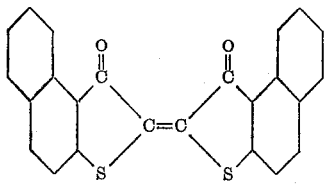

The procedure of Example 3 is followed except that an equivalent amount of potassium 1-nitronaphthalene-6-sulfonate is used in place of the potassium m-nitrobenzenesulfonate.

Example 9

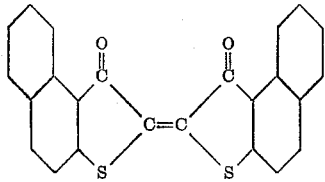

The procedure of Example 3 is followed except that an equivalent amount of sodium 2,4-dinitrobenzenesulfonate is used in place of the potassium m-nitrobenzenesulfonate.

Example 10

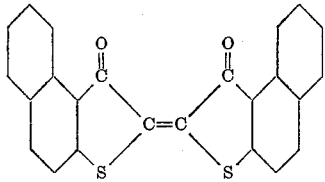

The procedure of Example 3 is followed except that an equivalent amount of potassium 2-chloro-5-nitrotoluene-4-sulfonate is used in place of the potassium m-nitrobenzenesulfonate.

Example 11

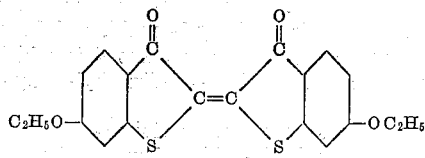

The procedure of Example 3 is followed except that an equivalent amount of potassium 2-chloro-5-nitrotoluene-4-sulfonic acid is used in place of the potassium m-nitrobenzenesulfonate and an equivalent amount of 6-ethoxy-3-oxythionaphthene is used in place of the (4,5)-benzo-3-oxythionaphthene.

Example 12

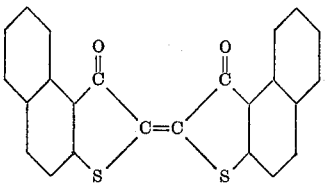

The procedure of Example 3 is followed except that the mixture is agitated at room temperature. The product is obtained but a substantially longer time is required for completion of the reaction.

Example 13

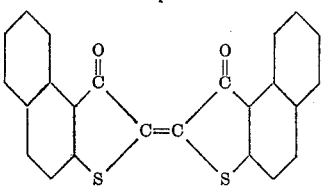

The procedure of Example 3 is followed except that an equivalent amount of potassium nitrobenzene-2,5-disulfonate is used in place of the potassium m-nitrobenzenesulfonate.

Example 14

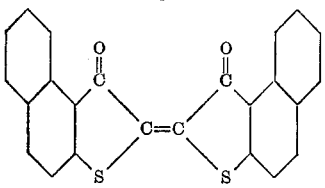

The procedure of Example 3 is followed except that an equivalent amount of sodium 2-chloro-5-nitrotoluene-4-sulfonate is used in place of the potassium m-nitrobenzenesulfonate.

We claim:

1. In the process of preparing thioindigoid dyestuffs involving the oxidation of a 3-oxythionaphthene in an aqueous medium in the presence of alkali, the improvement which comprises employing an oxidizing agent selected from the group consisting of nitro aromatic sulfonic acids of the benzene and naphthalene series of less than 3 rings, free from substituents other than halogen, lower alkyl and lower alkoxy groups, and the alkali metal and alkaline earth metal salts thereof.

2. The process according to claim 1 in which the nitro aromatic sulfonic acid is m-nitrobenzenesulfonic acid.

3. The process according to claim 2 in which the m-nitrobenzenesulfonic acid is in the form of its alkali-metal salt.

4. The process according to claim 3 in which the alkali metal salt is the potassium salt.

5. The process according to claim 4 in which the 3- oxythionaphthene is 6 - chloro-4-methyl-3-oxythionaphthene.

6. The process according to claim 4 in which the 3-oxythionaphthene is (4,5)-benzo-3-oxythionaphthene.

7. The process according to claim 4 in which the 3-oxythionaphthene is 6-ethoxy-3-oxythionaphthene.

8. The process according to claim 4 in which the 3-oxythionaphthene is 6-chloro-4,7-dimethyl-3-oxythionaphthene.

9. The process according to claim 4 in which the 3-oxythionaphthene is 5 - chloro-7-methyl-3-oxythionaphthene.

References Cited in the file of this patent
UNITED STATES PATENTS 2,173,506  Cole _____ Sept. 19, 1939

OTHER REFERENCES

Hartough and Meisel: "Condensed Thiophene Rings," Interscience Publishers, Inc., New York (1954), pages 181 and 186.

Groggins: "Unit Processes in Organic Synthesis," 4th ed. (1952), McGraw-Hill Book Co., page 426, New York.